United States Patent
Sudre

(10) Patent No.: US 12,195,404 B2
(45) Date of Patent: Jan. 14, 2025

(54) METHOD TO PRODUCE DENSE CERAMIC MATRIX COMPOSITES

(71) Applicant: RTX CORPORATION, Farmington, CT (US)

(72) Inventor: Olivier H. Sudre, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 426 days.

(21) Appl. No.: 16/880,625

(22) Filed: May 21, 2020

(65) Prior Publication Data
US 2021/0363069 A1   Nov. 25, 2021

(51) Int. Cl.
*C04B 41/50*   (2006.01)
*C04B 41/00*   (2006.01)
*C04B 41/45*   (2006.01)

(52) U.S. Cl.
CPC ...... *C04B 41/5096* (2013.01); *C04B 41/0081* (2013.01); *C04B 41/4519* (2013.01)

(58) Field of Classification Search
CPC ............ C04B 41/5096; C04B 41/0081; C04B 41/4519
See application file for complete search history.

(56) References Cited

U.S. PATENT DOCUMENTS

| | | | |
|---|---|---|---|
| 4,456,634 A | 6/1984 | Galasso et al. | |
| 5,139,594 A * | 8/1992 | Rabin | C04B 37/005 156/283 |
| 5,173,283 A * | 12/1992 | Parent | C30B 25/005 117/922 |
| 5,275,982 A | 1/1994 | Claar et al. | |
| 5,840,221 A * | 11/1998 | Lau | C04B 35/62871 264/29.7 |

(Continued)

FOREIGN PATENT DOCUMENTS

| | | |
|---|---|---|
| CN | 107903068 A | 4/2018 |
| JP | H03146470 A | 6/1991 |
| JP | 2009274887 A | 11/2009 |

OTHER PUBLICATIONS

European Search Report for European Application No. 21175124.3; Date of Search Oct. 28, 2021, 7 pages.

(Continued)

*Primary Examiner* — Alex B Efta
(74) *Attorney, Agent, or Firm* — CANTOR COLBURN LLP

(57) ABSTRACT

Disclosed is a method for making a ceramic matrix composite. The method includes infiltrating an initial ceramic matrix composite with a molten silicon infiltration material to form a silicon infiltrated composite; cooling the silicon infiltrated composite; heating a first portion of the cooled silicon infiltrated composite to a temperature in excess of the melt temperature of the silicon infiltration material in the presence of a carbon source; heating a second portion of the cooled silicon infiltrated composite to a temperature in excess of the melt temperature of the silicon infiltration material in the presence of a carbon source after heating the first portion; and cooling the heated portions to form a final ceramic matrix composite, wherein the first portion and second portion of the cooled silicon infiltrated composite are adjacent or overlap.

16 Claims, 1 Drawing Sheet

(56) References Cited

U.S. PATENT DOCUMENTS

| | | | | |
|---|---|---|---|---|
| 5,990,025 A | * | 11/1999 | Suyama | C04B 35/573 428/570 |
| 6,743,393 B1 | * | 6/2004 | Petrak | C04B 35/6267 264/626 |
| 8,980,027 B2 | | 3/2015 | Pailler et al. | |
| 9,856,176 B2 | | 1/2018 | Harris et al. | |
| 10,150,188 B1 | * | 12/2018 | Parolini | C04B 35/565 |
| 2002/0058107 A1 | * | 5/2002 | Fareed | C04B 35/62844 427/255.39 |
| 2003/0012938 A1 | * | 1/2003 | Bauer | C04B 37/008 428/293.4 |
| 2004/0192534 A1 | * | 9/2004 | Nixon | C04B 35/80 501/95.2 |
| 2005/0163988 A1 | * | 7/2005 | Ebert | F16D 69/023 428/292.1 |
| 2010/0279845 A1 | * | 11/2010 | Kebbede | C04B 35/62871 501/97.4 |
| 2012/0040139 A1 | | 2/2012 | Garandet et al. | |
| 2014/0287149 A1 | * | 9/2014 | Zimmermann | C23C 4/12 427/446 |
| 2018/0194690 A1 | | 7/2018 | Kirby | |

OTHER PUBLICATIONS

Kusunoki et al., "Crystal Growth of 4H—SiC on 6H—SiC by Traveling Solvent Method", Materials Science Forum, vols. 679-680, 2011, pp. 36-39.

Mauk et al., "Experimental assessment of metal solvents for low-temperature liquid-phase epitaxy of silicon carbide", Journal of Crystal Growth, 2001, pp. 322-329.

Pellegrini et al., "Liquid Phase Epitaxial Growth of SiC From Transition-Metal Silicide Solvents", Journal of Crystal Growth, 1974, pp. 320-324.

* cited by examiner

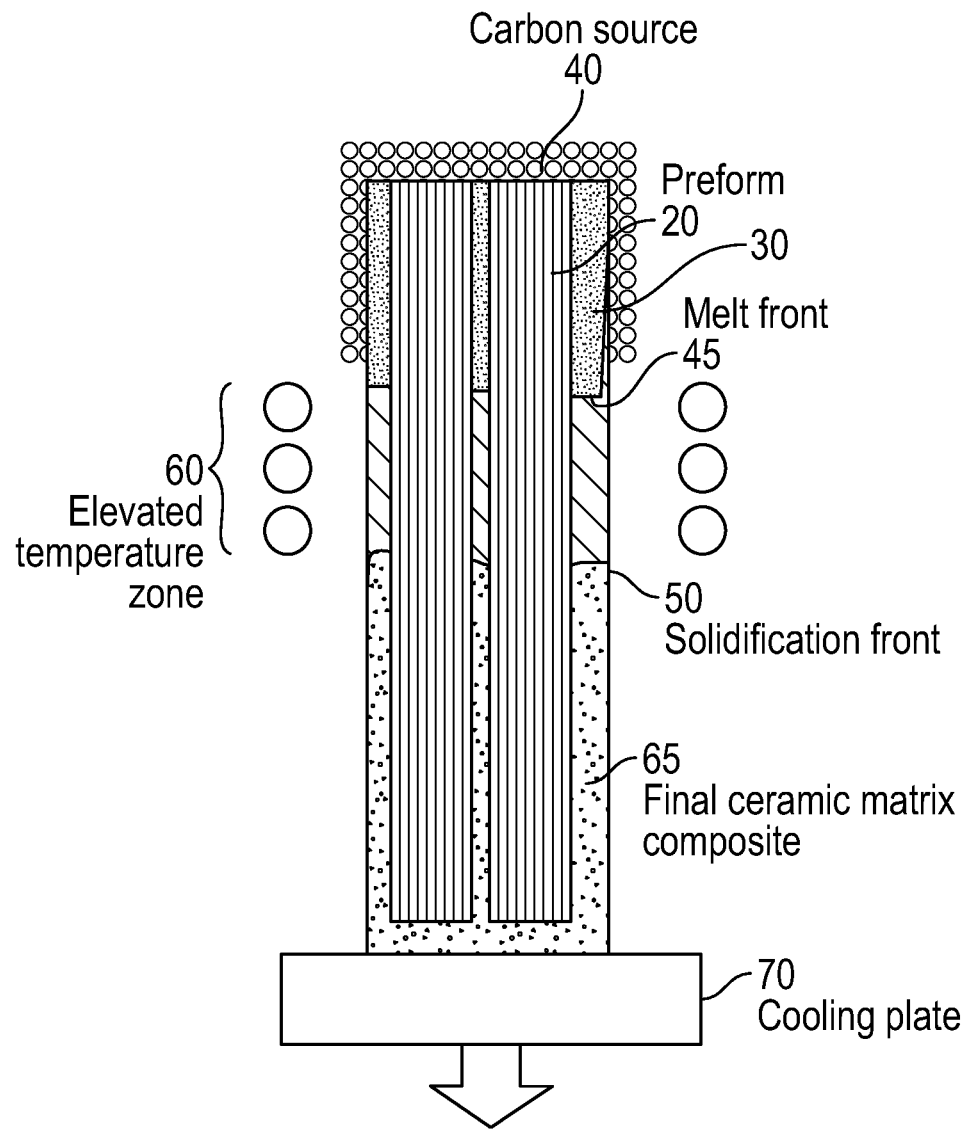

METHOD TO PRODUCE DENSE CERAMIC MATRIX COMPOSITES

BACKGROUND

Exemplary embodiments pertain to the art of ceramic matrix composite components.

Ceramic matrix composite (CMC) materials have been proposed as materials for certain components of gas turbine engines, such as the turbine blade outer air seals, vanes and blades. Various methods are known for fabricating CMC components, including, chemical vapor infiltration (CVI), melt infiltration (MI) and polymer pyrolysis (PIP) processes. CVI relies on infiltration to deposit matrix around preform fibers using a gaseous precursor that condenses as a solid phase around the fibers. CVI can leave residual porosity. Various approaches have been suggested to address this issue but new solutions are needed.

BRIEF DESCRIPTION

Disclosed is a method for making a ceramic matrix composite. The method includes infiltrating an initial ceramic matrix composite with a molten silicon infiltration material to form a silicon infiltrated composite; cooling the silicon infiltrated composite; successively heating a first portion and a second portion of the cooled silicon infiltrated composite to a temperature in excess of the melt temperature of the silicon infiltration material in the presence of a carbon source; and successively cooling the heated portions to form a final ceramic matrix composite, wherein the first portion and second portion of the cooled silicon infiltrated composite are adjacent or overlap.

In addition to one or more of the features described above, or as an alternative to any of the foregoing embodiments, the final ceramic matrix composite has less than 5 volume percent silicon infiltration material.

In addition to one or more of the features described above, or as an alternative to any of the foregoing embodiments, the final ceramic matrix composite has an average crystal size that is greater than the average crystal size of the initial ceramic matrix composite.

In addition to one or more of the features described above, or as an alternative to any of the foregoing embodiments, the composition of the silicon infiltration material varies based on location in the initial ceramic matrix composite.

In addition to one or more of the features described above, or as an alternative to any of the foregoing embodiments, the molten silicon infiltration material includes silicon or a silicon alloy.

In addition to one or more of the features described above, or as an alternative to any of the foregoing embodiments, the silicon alloy comprises silicon with aluminum, boron, chromium, hafnium, iron, molybdenum, niobium, rare earth metals, scandium, tantalum, titanium, tungsten, vanadium, yttrium, zirconium, or a combination thereof.

In addition to one or more of the features described above, or as an alternative to any of the foregoing embodiments, the method further includes depositing a carbon source in the initial ceramic matrix composite prior to infiltrating.

In addition to one or more of the features described above, or as an alternative to any of the foregoing embodiments, the temperature in excess of the melt temperature of the silicon infiltration material is greater than or equal to 1300° C., or greater than or equal to 1400° C., or greater than or equal to 1500° C. The temperature may be less than 2000° C.

In addition to one or more of the features described above, or as an alternative to any of the foregoing embodiments, the portions of the silicon infiltrated composite are heated to a temperature in excess of the melt temperature of the silicon infiltration material at a linear rate of 1 to 1000 millimeters (mm) percent per hour.

Also disclosed is a ceramic matrix composite having less than 5 volume percent silicon infiltration material.

In addition to one or more of the features described above, or as an alternative to any of the foregoing embodiments, the silicon infiltration material includes silicon or a silicon alloy.

BRIEF DESCRIPTION OF THE DRAWINGS

The following descriptions should not be considered limiting in any way. With reference to the accompanying drawings, like elements are numbered alike:

the FIGURE is a representation of a silicon infiltrated composite undergoing the method described herein.

DETAILED DESCRIPTION

Ceramic matrix composites can be produced using a variety of techniques. In one approach, a preform is provided and the space between the fibers is infiltrated to form an initial ceramic matrix composite. The initial ceramic matrix composite has porosity. Eliminating the porosity to near zero has a number of advantages: (1) maximizes thermal conductivity, (2) decreases matrix cracking stress by eliminating incipient flaws that are sources of early cracking, (3) increases interlaminar properties, (4) improves erosion resistance, and (5) prevents ingress of gases and fluids.

One approach to reduce porosity is to infiltrate the matrix of the initial ceramic matrix composite with a molten silicon infiltration material. The silicon infiltration material may react with any available carbon or refractory metal to form silicon carbide, refractory silicides or both. However, a residual amount of the silicon infiltration material typically remains and its presence may limit the temperature capability and performance of the composite as the silicon infiltration material softens and melts at temperatures lower than the rest of the ceramic matrix composite.

It would be desirable therefore to convert the residual silicon infiltration material to a material with a higher melt temperature. One approach is to use a traveling heat zone, optionally in combination with a carbon source, to convert the residual silicon infiltration material to a material with a higher melt temperature such as silicon carbide. The final ceramic matrix composite may have less than 5, or less than 1 volume (vol) % silicon infiltration material. The final ceramic matrix composite may also have an average grain size that is larger than the average grain size of the initial ceramic matrix composite.

An exemplary method includes infiltrating an initial ceramic matrix composite with a molten silicon infiltration material to form a silicon infiltrated composite; cooling the silicon infiltrated composite in part or whole; successively heating portions of the cooled silicon infiltrated composite to a temperature in excess of the melt temperature of the silicon infiltration material in the presence of a carbon source; and successively cooling the heated portions to form a final ceramic matrix composite. Successively heating portions of the cooled silicon infiltrated composite is defined as heating a first portion of the cooled silicon infiltrated composite to a temperature in excess of the melt temperature of the silicon infiltration material in the presence of a carbon source followed by heating an adjacent or overlapping portion of the cooled silicon infiltrated composite. These steps can be repeated as needed. The whole of the cooled silicon infiltrated composite may be successively heated or only part of the cooled silicon infiltrated composite.

The initial ceramic matrix composite includes a preform. A preform is a porous fiber structure formed from unidirectional fiber elements such as yarns, tows, or tapes by a winding process or by a process of arranging the fiber in three dimension using techniques such as weaving, braiding or knitting. It is also possible to form a preform from unidirectional fiber plies, two dimensional fiber plies or a combination thereof that are layered and bonded together.

Exemplary fibers include silicon carbide, carbon, or other carbides. The fibers may comprise one or several coatings used as interfaces between the fiber and the matrix in the composite before the preforming step. In some cases the interface coating(s) are applied to the fibers once they have been assembled into a preform.

The preform is infiltrated, typically using chemical vapor infiltration (CVI) to form a matrix around the preform fibers, resulting in the initial ceramic composite material. Exemplary matrix materials include silicon carbide (SiC), other carbides such as $B_4C$, HfC, ZrC, and combinations thereof. After infiltration, the initial ceramic composite material may have a porosity of 10% to 60%.

The initial ceramic matrix composite is infiltrated with a molten silicon infiltration material such as silicon or a silicon alloy. Exemplary silicon alloys include alloys of silicon with aluminum, boron, chromium, hafnium, iron, molybdenum, niobium, rare earth metals, scandium, tantalum, titanium, tungsten, vanadium, yttrium, zirconium, or a combination thereof. Rare earth metals include the lanthanides (elements 57-71) as well as scandium and yttrium. Prior to the molten infiltration, one or more carbon source materials may be deposited in the initial ceramic matrix composite material. The carbon source material may include a dopant, such as aluminum, boron, chromium, hafnium, iron, molybdenum, niobium, rare earth metals, scandium, tantalum, titanium, tungsten, vanadium, yttrium, zirconium, or a combination thereof to reduce the melting point of the silicon infiltration material or to increase the solubility of carbon in the melt. Although it is desirable to react all the silicon in the silicon infiltration material to form silicon carbide or a silicide, it is known in the art that the presence of residual silicon is typical. As mentioned above, not all of the silicon infiltration material reacts and thus there is residual silicon infiltration material in the silicon infiltrated composite.

In some instances, the amount of residual silicon infiltration material can be controlled by adjusting the amount of available carbon prior to the silicon melt infiltration. The amount of residual silicon infiltration material is preferably such that a continuous phase exists throughout the composite so that a liquid front can move unimpeded through the composite upon re-melting. The amount of residual silicon infiltration material is preferably between 5 and 20 vol %.

In order to convert some or all of the residual silicon infiltration material to a material with a higher melting temperature, portions of the silicon infiltrated composite are successively subjected to a heat zone having a temperature in excess of the melting temperature of the silicon infiltration material in the presence of a carbon source. The melting temperature of the silicon infiltration material is defined as the temperature required to melt one or more components of the silicon infiltration material. Heating causes the silicon infiltration material to melt and react with the carbon source to form silicon carbide. Exemplary carbon sources include graphite, ethane gas, methane gas, or combinations thereof. Temperatures in excess of the melt temperature of the silicon infiltration material are desirable to facilitate diffusion of carbon into the melted material. In some embodiments portions of the silicon infiltrated composite are successively exposed to temperatures greater than or equal to 1300° C., greater than or equal to 1400° C., or greater than or equal to 1500° C. The temperature may be less than 2000° C. The temperature may only be limited by the thermal stability of other elements of the composite for example, the fiber and interphase(s).

Because only portions of the silicon infiltrated composite are subjected to the elevated temperature, a temperature gradient forms. The temperature gradient resulting from cooling of the previously heated portions results in crystallization of the silicon carbide. The final ceramic matrix composite may have silicon carbide crystals with a size of 20 micrometers. The final ceramic matrix composite may have an average crystal size greater than the average crystal size of the initial ceramic matrix composite. The final ceramic composite may have less than 1 vol % silicon infiltration material.

In some embodiments successive sections of the silicon infiltrated composite having a height of 5 to 50 mm are subjected to a temperature in excess of the melt temperature of the silicon infiltration material for a time sufficient to convert the silicon infiltration material to a material with a higher melting temperature. Depending upon the conditions the time may be on the order of minutes or hours. In some embodiments the silicon infiltrated composite is heated to a temperature in excess of the melt temperature of the silicon infiltration material at a linear rate of 1 to 1000 mm per hour.

In some embodiments, the silicon infiltrated composite is held at temperature close to the melting point of the silicon infiltration material and only a section of the silicon infiltrated composite is at a temperature above the melting point of the silicon infiltration material.

In some embodiments the composition of the silicon infiltration material, the distribution of a dopant in the carbon source or both may be varied to result in differing amounts of alloying elements, dopants or both in different locations in the silicon infiltrated composite. It is contemplated that the distribution of the alloying element, dopant or both may be affected by the successive heating of portions of the silicon infiltrated composite and by differing the amounts of the alloying elements, dopants or both prior to successive heating the desired final distribution may be achieved.

The FIGURE depicts a silicon infiltrated composite 30 undergoing heat treatment. The silicon infiltrated composite has a preform 20 and a carbon source coating 40. The melt front 45 forms upon entrance to the elevated temperature zone 60 and solidification front 50 forms upon exit. The final ceramic matrix composite 65 is formed upon cooling. The method may optionally employ a cooling plate 70.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for making a ceramic matrix composite comprising infiltrating an initial ceramic matrix composite with a molten silicon infiltration material to form a silicon infiltrated composite;
cooling the silicon infiltrated composite;
performing a successive heating and cooling of a first portion and a second portion of the cooled silicon infiltrated composite with a traveling heat zone comprising
heating a first portion of the cooled silicon infiltrated composite to a temperature in excess of the melt temperature of the silicon infiltration material in the presence of a carbon source to form a heated first portion;
cooling the heated first portion;
heating a second portion of the cooled silicon infiltrated composite to a temperature in excess of the melt temperature of the silicon infiltration material in the presence of a carbon source to form a heated second portion; and
cooling the heated second portion to form a final ceramic matrix composite,
wherein the first portion and the second portion of the cooled silicon infiltrated composite are adjacent or overlap;
wherein the successive heating and cooling of the first portion and the second portion of the cooled silicon infiltrated composite may be repeated;
wherein successive cooling of the first heated portion and the second heated portion to form the final ceramic matrix composite provides crystallization of the silicon infiltration material.

2. The method of claim 1, wherein the final ceramic matrix composite has less than 1 volume percent silicon infiltration material.

3. The method of claim 1, wherein the final ceramic matrix composite has an average crystal size and the initial ceramic matrix composite has an average crystal size and the average crystal size of the final ceramic matrix composition is greater than the average crystal size of the initial ceramic matrix composite.

4. The method of claim 1, wherein the composition of the silicon infiltration material varies based on location in the initial ceramic matrix composite.

5. The method of claim 1, wherein the molten silicon infiltration material comprises silicon or a silicon alloy.

6. The method of claim 5, wherein the silicon alloy comprises silicon with aluminum, boron, chromium, hafnium, iron, molybdenum, niobium, a rare earth metal, scandium, tantalum, titanium, tungsten, vanadium, yttrium, zirconium or a combination thereof.

7. The method of claim 1, further comprising depositing a carbon source in the initial ceramic matrix composite prior to infiltrating.

8. The method of claim 4, wherein the carbon source comprises aluminum, boron, chromium, hafnium, iron, molybdenum, niobium, rare earth metals, scandium, tantalum, titanium, tungsten, vanadium, yttrium, zirconium, or a combination thereof.

9. The method of claim 1, wherein the temperature in excess of the melt temperature of the silicon infiltration material is greater than or equal to 1300° C.

10. The method of claim 1, wherein the temperature in excess of the melt temperature of the silicon infiltration material is greater than or equal to 1400° C.

11. The method of claim 1, wherein the temperature in excess of the melt temperature of the silicon infiltration material is greater than or equal to 1500° C.

12. The method of claim 1, wherein the silicon infiltrated composite is heated to a temperature in excess of the melt temperature of the silicon infiltration material at a predetermined rate.

13. The method of claim 1, wherein the final ceramic matrix composite comprises silicon carbide crystals with a size of 20 micrometers.

14. The method of claim 1, wherein the successive heating and cooling of the first portion and the second portion of the cooled silicon infiltrated composite forms a temperature gradient;
wherein heating of the first portion and the second portion of the cooled silicon infiltrated composite in excess of a melt of the silicon infiltration material in the presence of a carbon source converts some or all of the silicon infiltration material to silicon carbide; and
wherein the temperature gradient provides crystallization of the silicon carbide.

15. A ceramic matrix composite having less than 5 volume percent silicon infiltration material;
wherein the ceramic matrix composite has silicon carbide crystals;
wherein the composition of the silicon infiltration material varies based on location in the ceramic matrix composite;
wherein the ceramic matrix composite comprises silicon carbide crystals with a size of 20 micrometers,
wherein the silicon infiltration material includes a silicon alloy comprising silicon with aluminum, chromium, hafnium, iron, niobium, a rare earth metal, scandium, tantalum, titanium, tungsten, vanadium, yttrium, zirconium or a combination thereof.

16. The ceramic matrix composite of claim 15, wherein the silicon infiltration material includes silicon or a silicon alloy and a dopant, wherein the dopant is distributed in the ceramic matrix composite in varied to result in different amounts of dopant in different locations in the ceramic matrix composite, wherein the dopant is aluminum, boron, chromium, hafnium, iron, molybdenum, niobium, scandium, tantalum, titanium, tungsten, vanadium, yttrium, zirconium, or a combination thereof.

* * * * *